United States Patent
Pednault

(10) Patent No.: US 6,810,368 B1
(45) Date of Patent: Oct. 26, 2004

(54) MECHANISM FOR CONSTRUCTING PREDICTIVE MODELS THAT ALLOW INPUTS TO HAVE MISSING VALUES

(75) Inventor: Edwin Peter Dawson Pednault, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 09/106,784

(22) Filed: Jun. 29, 1998

(51) Int. Cl.[7] ............................ G06F 7/60; G06F 17/10; G06F 101/00
(52) U.S. Cl. .................. 703/2; 706/16; 706/25; 706/52
(58) Field of Search ................................ 703/2; 706/16, 706/25, 50, 52, 919

(56) References Cited

U.S. PATENT DOCUMENTS

| | | | |
|---|---|---|---|
| 5,675,553 A | * 10/1997 | O'Brien, Jr. et al. | 367/135 |
| 5,819,006 A | * 10/1998 | Keeler et al. | 706/25 |
| 5,842,189 A | * 11/1998 | Keeler et al. | 706/16 |
| 5,970,482 A | * 10/1999 | Pham et al. | 706/16 |

OTHER PUBLICATIONS

Apte et al., "Decomposition of Heterogeneous Classification Problems," Lecture Notes in Computer Science, vol. 1280 / 1997, pp. 17–28 (1997).*

Bauer et al., "Update Rules for Parameter Estimation in Bayesian Networks," Proceedings of the 13th Annual Conference on Uncertainty in AI (1997) (paper available at http://citeseer.ist.psu.edu/bauer97update.html).*

Quinlan, "Unknown Attribute Values in Induction," University of Sydney (1989) (paper available at http://citeseer.ist.psu.edu/quinlan89unknown.html).*

Cowell et al, "Sequential Model Criticism in Probabilistic Expert Systems", IEEE Transactions on Pattern Analysis and Machine Intelligence, vol. 15 No. 3, pp. 209–219, Mar. 1993.*

* cited by examiner

*Primary Examiner*—Samuel Broda
(74) *Attorney, Agent, or Firm*—Stephen C. Kaufman, Esq.; McGinn & Gibb, PLLC

(57) ABSTRACT

A method for constructing predictive models that can be used to make predictions in situations where the inputs to those models can have values that are missing or are otherwise unknown. The method can realize significant advantages because it can be readily applied in conjunction with any method for constructing models, including ones that require all input values to be known, thereby yielding combined methods for constructing models that tolerate missing values.

20 Claims, 2 Drawing Sheets

TABLE I: Example of input values that are missing at random.

| Input X | Value to be Predicted Y |
|---|---|
| 2 | 2 |
| 6 | 4 |
| 12 | 7 |
| 14 | 8 |
| 20 | 11 |
| ???? | 3 |
| ???? | 9 |
| ???? | 12 |

TABLE I: Example of input values that are missing at random.

| Input X | Value to be Predicted Y |
|---|---|
| 2 | 2 |
| 6 | 4 |
| 12 | 7 |
| 14 | 8 |
| 20 | 11 |
| ???? | 3 |
| ???? | 9 |
| ???? | 12 |

FIGURE 1.

TABLE II: Example of input values that are not missing at random.

| Input X | Value to be Predicted Y |
|---|---|
| 2 | 2 |
| 6 | 4 |
| 12 | 7 |
| 14 | 8 |
| 20 | 11 |
| ???? | -20 |
| ???? | -25 |
| ???? | -30 |

FIGURE 2.

MECHANISM FOR CONSTRUCTING PREDICTIVE MODELS THAT ALLOW INPUTS TO HAVE MISSING VALUES

FIELD OF THE INVENTION

This invention relates to a method for constructing predictive models that can be used to make predictions in situations where the inputs to those models can have values that are missing or are otherwise unknown.

BACKGROUND OF THE INVENTION

Thd invention considers a widely applicable method of constructing predictive models that are capable of generating reliable predictions even when the values of some model inputs are missing or are otherwise unknown. In this regard, it has been discerned that constructing such models is an important problem in many industries that employ predictive modeling in their operations. For example, predictive models are often used for direct-mail targeted-marketing purposes in industries that sell directly to consumers. In this application, predictive models are used to optimize return on marketing investment by ranking consumers according to their predicted responses to promotions, and then mailing promotional materials only to those consumers who are most likely to respond and generate revenue. Such predictive models typically employ demographic, credit, and other data as inputs, and these data often contain many missing values. Generating predictions with greater reliability despite the presence of missing values can lead to better returns on marketing investments for this application. Similar economic benefits can likewise be expected in other commercial applications of predictive modeling.

SUMMARY OF THE INVENTION

It has also been also discerned that numerous deficiencies exist in the prior art on how to handle missing values. With regard to constructing predictive models on the basis of training data, the prior art on handling missing values can be roughly divided into six categories (not mutually exclusive):

1) METHODS THAT IGNORE TRAINING CASES THAT CONTAIN MISSING VALUES. This approach is simple and straightforward to mechanize, but it can produce models that generate unreliable predictions when the proportion of missing values is high (see, for example, L. Breiman, J. H. Friedman, R. A. Olshen, and C. J. Stone, Classification and Regression Trees, Chapman and Hall, 1993; R. J. A. Little and D. B. Rubin, Statistical Analysis with Missing Data, John Wiley and Sons, 1987; J. R. Quinlan, "Unknown attribute values in induction," Proceedings of the Sixth International Machine Learning Workshop, pp 164–168, Morgan Kaufmann, 1989; and M. Singh, "Learning Bayesian networks from incomplete data," Proceedings of the Fourteenth National Conference on Artificial Intelligence, pp 534–539, American Association for Artificial Intelligence, 1997).

2) METHODS THAT IGNORE DATA FIELDS THAT CONTAIN MISSING VALUES. Although rarely discussed in the literature, this approach is often employed in practice by data analysts, particularly in combination with the first approach. When the two approaches are combined, combinations of cases and data fields are removed from the training data until all remaining data fields and training cases contain known data values. The problem with ignoring data fields, however, is that it throws away potentially useful information that might have yielded more accurate models had alternative methods of handling missing values been employed.

3) METHODS THAT INTRODUCE "MISSING" AS A LEGITIMATE DATA VALUE. This approach is valid only when missing values convey information. For example, if the date of last pregnancy is missing from a patient's medical record, then it is likely that the patient either is male and is unable to become pregnant, or the patient is female and has never been pregnant. However, when values are missing for random reasons, the fact that they are missing conveys no information about the true data values. In such instances, treating "missing" as a legitimate data value can produce inferior models compared to other approaches to handling missing values (see, for example, J. R. Quinlan, "Unknown attribute values in induction," Proceedings of the Sixth International Machine Learning Workshop, pp 164–168, Morgan Kaufmann, 1989). The reason for the inferior performance seems to stem from the fact that treating missing as a legitimate value in this case does not adequately take into account the fact that there actually should be a value but that value is not known (see, for example, M. Singh, "Learning Bayesian networks from incomplete data," Proceedings of the Fourteenth National Conference on Artificial Intelligence, pp 534–539, American Association for Artificial Intelligence, 1997). In summary, when missing values convey information, it is reasonable to introduce "missing" as a legitimate value. When missing values convey no information, some other approach to handling these missing values should be employed.

4) METHODS THAT FILL-IN MISSING VALUES VIA IMPUTATION PROCEDURES. This approach involves replacing missing values by estimated values and then employing model-construction methods that assume that all data values are known (see, for example, L. Breiman, J. H. Friedman, R. A. Olshen, and C. J. Stone, Classification and Regression Trees, Chapman and Hall, 1993; R. J. A. Little and D. B. Rubin, Statistical Analysis with Missing Data, John Wiley and Sons, 1987; J. R. Quinlan, "Unknown attribute values in induction," Proceedings of the Sixth International Machine Learning Workshop, pp 164–168, Morgan Kaufmann, 1989; and M. Singh, "Learning Bayesian networks from incomplete data," Proceedings of the Fourteenth National Conference on Artificial Intelligence, pp 534–539, American Association for Artificial Intelligence, 1997). The replacement can be performed once (i.e., single imputation) or several times (i.e., multiple imputation). Multiple imputation generally produces better results than single imputation (see, for example, R. J. A. Little and D. B. Rubin, Statistical Analysis with Missing Data, John Wiley and Sons, 1987). However, in order to estimate missing values in the first place, one must construct models for those missing values. Because some models can be more accurate than others, the quality of the predictive model constructed from filled-in values is ultimately dependent on the quality of the missing-value models used to calculate those filled-in values. Moreover, constructing accurate missing-value models can itself be problematic, requiring invention to solve.

5) METHODS THAT EMPLOY WEIGHTING SCHEMES IN THE CALCULATION OF MODEL PARAMETERS IN AN ATTEMPT TO COMPENSATE FOR THE PRESENCE OF MISSING DATA. This approach is common in the analysis of survey data wherein people who are surveyed can choose not to respond to some or all of the survey questions. Adjustments are therefore made in the analysis of the results to compensate for nonresponses by introducing weighting factors in the calculations performed on the known responses (see, for example, R. J. A. Little and D. B. Rubin, Statistical Analysis with Missing Data, John Wiley and Sons, 1987). The calculation of weights is based on assumed models for the occurrences of nonresponses. Inaccuracies in these models therefore produce inaccuracies in the analysis of the data.

Weighting schemes are also employed in some classification and regression tree algorithms (see, for example, J. R. Quinlan, "Unknown attribute values in induction," Proceedings of the Sixth International Machine Learning Workshop, pp 164–168, Morgan Kaufmann, 1989). However, these weighting schemes are actually mathematically equivalent to performing multiple imputations with extremely large numbers of replacements. In essence, the weights correspond to probabilities in statistical models that are constructed for the missing values as part of the tree-building process. Instead of actually performing imputations and constructing trees from filled-in data, it is computationally more efficient to modify the tree-construction algorithms to employ weights that are calculated from the missing-value models. Because these weighting schemes can be derived from imputation procedures, they suffer the same drawbacks as do imputation procedures.

6) METHODS THAT INTRODUCE FREE PARAMETERS INTO THE MODEL THAT REPRESENT THE MISSING DATA AND THAT THEN ESTIMATE THESE PARAMETERS BASED ON THE DATA VALUES THAT ARE KNOWN. The Expectation Maximization (EM) algorithm (see, for example, A. Dempster, N. Laird, and D. Rubin, "Maximum likelihood from incomplete data via the EM algorithm," Journal of the Royal Statistical Society, Series B, Vol. 39, pp. 1–38, 1977; and R. J. A. Little and D. B. Rubin, Statistical Analysis with Missing Data, John Wiley and Sons, 1987) is the principal method that is employed for estimating the missing-data parameters as an integral part of the model-construction process. However, the so-called EM algorithm is actually a system of generalized mathematical equations that must be given specific forms for specific applications. In addition, considerable skill and ingenuity is often required to reduce the equations for specific applications into sequences of calculations that can then be mechanically realized. Thus, while the EM algorithm is very general and has many advantages, it often requires invention to apply the EM algorithm in practice.

In summary, the first three approaches to handling missing values that are listed above are straightforward and can be readily applied. However, each has its individual disadvantages. The last three approaches are more sophisticated and avoid some of the deficiencies of the first three approaches; however, they often require skill, ingenuity, and/or invention to be applied in practice.

As indicated above, we have discerned that the prior art methods of handling missing values in predictive models the invention has deficiencies that either result in the construction of models that generate poor predictions relative to other approaches, or that prevent the methods from being readily mechanized and applied in practice.

In sharp contrast, the present invention has now discovered a methodology for handling missing values that can be readily mechanized in a widely applicable fashion, and that yields models that produce reliable predictions relative to other model-construction methods. In its generalized expression, the method comprises a program storage device readable by a machine, tangibly embodying a program of instructions executable by the machine to perform method steps for constructing predictive models that can be used to make predictions even when the values of some or all inputs are missing or are otherwise unknown, the method steps comprising:

1) presenting a collection of training data comprising examples of input values that are available to the model together with the corresponding desired output value(s) that the model is intended to predict; and 2) generating a plurality of subordinate models, that together comprise an overall model, in such a way that:
   a) each subordinate model has an associated set of application conditions that must be satisfied in order to apply the subordinate model when making predictions, the application conditions comprising
      i) tests for missing values for all, some, or none of the inputs, and
      ii) tests on the values of all, some, or none of the inputs that are applicable when the values of the inputs mentioned in the tests have known values; and
   b) for at least one subordinate model, the training cases used in the construction of that subordinate model include some cases that indirectly satisfy the application conditions in the sense that the application conditions are satisfied only after replacing one or more known data values in these training cases with missing values.

In its generalized expression, the novel method can realize significant advantages because it can be readily applied in conjunction with any method for constructing models, including ones that require all input values to be known, thereby yielding combined methods for constructing models that tolerate missing values.

In a particularized expression, for example, the novel method can be used in combination with classification and regression trees, classification and regression rules, or stepwise regression. The novel method thus has great general utility and can be used to solve prediction problems in numerous applications involving data with missing values.

BRIEF DESCRIPTION OF THE DRAWINGS

The invention is illustrated in the accompanying drawings, in which:

FIG. 1 provides Table I comprising an example of input values that are missing at random; and FIG. 2 provides Table II comprising an example of input values that are not missing at random.

DETAILED DESCRIPTION OF THE INVENTION

As summarized above, the present invention can be readily applied in conjunction with any method for constructing models, including ones that require all input values to be known, thereby yielding combined methods for constructing models that tolerate missing values. The invention embodies the following principle:

1) when making predictions, it is better to base those predictions on inputs whose values are known than on inputs with missing values;

from which it follows that 2) if an input value to a preferred model is missing, then the prediction should be based on an alternate model that employs other data fields as inputs whose values are known.

By repeatedly applying this second principle, which is a corollary of the first, one can construct an overall model that consists of a plurality of subordinate models, one of which can always be applied for any combination of missing values among the ensemble of input fields employed by the subordinate models.

An important step in the invention is that, whenever an additional data field is incorporated into the construction of a subordinate model, an alternate subordinate model is preferably constructed for use when that data field has a missing value. In applying this important step, attention must also be given to the subsets of training data used in the construction of the subordinate models. The issues that must be considered can be illustrated by way of a simple example.

Suppose that the training data consists of the table of values shown in FIG. 1. The task is to construct a model that predicts the value of data field Y, where field X can be used as an input to the model. By analyzing the relationship between the known values of X and Y, it is evident that the following equation is a good predictor of Y when the value of X is known:

$$\text{Predicted } Y=(0.5)*X+1.$$

This equation can be mechanically obtained by performing a least-squares linear regression on the known values of X and Y.

Thus, the first subordinate model in the plurality constructed for FIG. 1 would be defined by the equation above with the application condition that the value of X must be known.

Because the first subordinate model requires X to be known, a second subordinate model also needs to be introduced into the plurality to predict Y when the value of X is missing. If the prior art method of treating "missing" as a legitimate value were to be employed, the predicted value of Y would be estimated based only on those training cases for which the value of X is missing. For example, one possible estimate would be the average Y value when X is missing, which in the case of FIG. 1 would be 8.0 plus or minus 2.6, where 2.6 is the standard error of the estimated mean of 8.0.

As discussed above, this prior art approach is reasonable provided that information is being conveyed by the fact that X is missing. However, if values of X were missing for random reasons, then the training cases in which X is missing would be a random subset of the overall population of training cases. A more accurate estimate of the mean of Y could therefore be obtained by using all training cases independent of the status of X.

In the case of FIG. 1, values of X are indeed missing for random reasons. This fact can be verified by performing a Student-t test, which shows with a p-value of 0.595 that there is no statistically significant difference in the means of those Y values that are associated with known values of X compared to those associated with missing values of X. Combining all values of Y to estimate the mean is therefore justified and this method of calculation yields an estimate of 7.0 plus or minus 1.3. Notice that the standard error (i.e., 1.3) is now lower, reflecting the fact that the new estimate of 7.0 has a smaller estimation error than the previous estimate of 8.0.

The second subordinate model in the plurality constructed for FIG. 1 would therefore be defined by the equation $$\text{Predicted } Y=7.0.$$

This second subordinate model would have the application condition that the value of X must be missing for the subordinate model to be applied.

Note that the training cases used to construct the second subordinate model include not only those that directly satisfy the application conditions, but also those that satisfy the application condition when known values of X are replaced with missing values. The latter training cases are said to "indirectly satisfy" the application conditions. By combining the training cases that directly satisfy the application conditions with those that indirectly satisfy the conditions, the subordinate model is in effect constructed by ignoring X entirely. Only the remaining information available from the training data is used in the construction of the second subordinate model. The second subordinate model is not as accurate as the first, but it is still the best model possible when the value of X is not known.

The above notion of indirectly satisfying a set of conditions, and the use of this notion to construct predictive models for use when certain data fields have missing values, is an important idea that can distinguish the present invention from prior art methods.

The above method, however, is not always appropriate. If values of X are not missing for random reasons, then information is being conveyed by the fact that X is missing. In that case, the prior art method of treating missing as a legitimate data value should be employed and only those training values that directly satisfy the application conditions of the second subordinate model should be used to estimate the model parameters. FIG. 2 illustrates the reason why. Applying the Student-t test shows that the two populations of Y values in FIG. 2 (i.e., those for which the value of X is known and those for which X is missing) have different means with a confidence level of 99.8%. It would therefore be inappropriate to combine both populations to calculate a mean for Y that would then be used to predict Y only when X is missing. Only those training cases that directly satisfy the application conditions (i.e., those for which the value of X is missing) should be used, yielding an estimated mean of −25.0 plus or minus 2.9. The second subordinate model in the plurality that would be constructed for FIG. 2 would then be defined by the equation $$\text{Predicted } Y=-25.0.$$

For some prediction problems, it can be ascertained from the data collection methods whether data values are missing at random or whether missing values convey information. However, in many cases, particularly when employing demographic and other data purchased from data vendors, the data collection methods are not completely known and no a priori information is available regarding the nature of the various missing values.

In cases where no a priori information is available regarding the randomness of missing values, the invention permits a determination of randomness to be made by examining the data itself. This ability is an additional feature that can distinguish the invention from prior art methods.

As illustrated above, standard statistical tests, such as the Student-t test, can be used to determine the randomness of missing values. However, such tests are typically valid only for certain types of models. Alternatively, the randomness of missing values can be assessed using cross-validation techniques. For general discussions on cross validation see, for example, M. Stone, "Cross-validatory choice and assessment of statistical predictions," Journal of the Royal Statistical Society, Series B, Vol. 36, pp 111–147, 1974; and M. Kearns, "A bound on the error of cross validation using the approximation and estimation rates, with consequences for the training-test split," Neural Computation, Vol. 9, pp 1143–1161, 1997. The advantage of cross validation is that it is valid for any type of model and it is easy to apply in practice. Cross validation techniques permit the invention disclosed herein to be readily mechanized in combination with other predictive modeling methods used to construct the subordinate models.

To apply cross validation in the present context, portions of the training cases that directly satisfy the application conditions of a subordinate model would be selected and held aside for validation purposes. Two models would then be constructed using the remaining training cases that directly satisfy the application conditions but were not held aside. One of these models would be constructed based only on the remaining cases. The other model would be constructed based on the remaining cases plus those training cases that indirectly satisfy the application conditions. The prediction errors of the two models would then be estimated by applying the models to the training cases that were held aside for validation purposes. If the predictive accuracy of the first model is greater than that of the second model with sufficiently high statistical significance, then it can be assumed that missing values in the relevant fields are informative and the subordinate model should be constructed only from those training cases that directly satisfy the application conditions of the subordinate model. Otherwise, missing values can be treated as random events and all of the training cases that directly or indirectly satisfy the application conditions should be used in the construction of the subordinate model. Note that, once again, the notion of indirectly satisfying a set of conditions is being used, this time to decide how to treat missing values.

The cross-validation method described above can be further refined for the case in which a subordinate model is constructed for use when two or more data fields have missing values. The refinement allows the missing values of some of these data fields to be treated as missing at random while others are treated as informative. The training cases used to construct the subordinate model then consist of those that directly satisfy the application conditions of the subordinate model together with those that indirectly satisfy the application conditions when known data values are replaced with missing values, but only for those data fields for which missing values are to be treated as missing at random. The same cross-validation method as described above can be employed to assess the predictive accuracies of different combinations of data fields for which missing values are to be treated as missing at random. The combination that yields the greatest predictive accuracy is the combination that should be used in the construction of the subordinate model.

In practice, the number of such combinations can grow prohibitively large to exhaustively evaluate all combinations. In such cases, the following "greedy method" can be employed to obtain a satisfactory determination of which missing values should be treated as missing at random and which should be treated as informative:

1) Begin by constructing a model assuming that all missing values are to be treated as informative (i.e., the model is to be constructed from those training cases that directly satisfy the application conditions of the subordinate model but are not being held aside for validation purposes). Call this model the "current model."

2) For each missing value in the "current model" that is treated as informative, construct another model that treats that missing value as missing at random while treating all other missing values in the same manner as done by the "current model."

3) Of the new models, choose the one that yields the greatest predictive accuracy on the training cases defined in Step 1 that were used to construct the first "current model," and call this new model the "current model."

4) Repeat Steps 2 and 3 until all missing values are treated as missing at random by the "current model."

5) Of all "current models" obtained in Steps 1 and 3, choose the model that yields the greatest predictive accuracy on the training cases held aside for validation purposes, and call this model the "best model."

6) Construct the subordinate model (without holding training cases aside for validation purposes) using the same treatments of missing values that were used in the construction of the "best model."

The above "greedy method" examines considerably fewer combinations of missing value treatments than an exhaustive examination. It also incorporates elements of the "structural risk minimization" methodology described by Vapnik (see, for example, V. N. Vapnik, The Nature of Statistical Learning Theory, Springer Verlag, 1995). In Vapnik's terminology, the "current models" obtained in Steps 1 and 3 form a "structure" and are constructed in order from the model most likely to overfit the training data to the model least likely to overfit the training data. Step 5 applies the principles of "structural risk minimization" to select the best model in the structure that does not overfit the training data. To further reduce the risk of overfitting in the manner described by Vapnik, it is preferable in Step 5 to compare the statistical confidence intervals on the predictive accuracies of the "current models" when selecting the "best model" instead of relying on the (estimated) predictive accuracies alone.

As an additional practical consideration, it is also possible to defer making final decisions as to how to treat missing values for subordinate models until later in the model construction process. In principle, these decisions should be made for each modeling option that is explored. However, because the number of options explored can often be many times greater than the number of subordinate models in the final plurality, it can be highly beneficial from an efficiency standpoint to defer missing-value decisions until a suitable proportion of the options have been eliminated from further consideration.

Deferment can be accomplished, for example, by holding existing treatments of missing values constant when comparing alternate refinements of the plurality and then reevaluating the treatments of missing values after the field of alternates has been narrowed. Although this approach does not guarantee that optimal selections will be made among alternate refinements, the approach substantially reduces the amount of analysis that is required and it therefore has pragmatic value.

The preferred method steps of the overall invention are now disclosed. The steps are presented in such a way that they may be readily combined with any method for constructing the subordinate models of the plurality, including ones that require all input values to be known. For example, one can readily combine the preferred method steps with stepwise regression (see, for example, Statistical Sciences, S-PLUS Guide to Statistical and Mathematical Analysis, Version 3.3, MathSoft, Inc., 1995), classification and regression trees (see, for example, L. Breiman, J. H. Friedman, R. A. Olshen, and C. J. Stone, Classification and Regression Trees, Chapman and Hall, 1993; and J. R. Quinlan, C4.5: Programs for Machine Learning, Morgan Kaufmann, 1993), or classification and regression rules (see, for example, J. R. Quinlan, C4.5: Programs for Machine Learning, Morgan Kaufmann, 1993; and P. Domingos, "Unifying instance-based and rule-based induction," Machine Learning, Vol. 24, pp 141–168, 1996). Note that the training cases used in the construction of the subordinate models are preferably determined from the associated application conditions as previously discussed. Likewise, the treatment of missing values are preferably determined using any of the methods described above as appropriate. Note, furthermore, that the steps may be conventionally executed in a computer, and programmed (in, say, C++) in memory for operation by a CPU.

Step 1 preferably comprises constructing an initial plurality of models called the "current plurality." If a top-down method is used to construct the subordinate models (e.g., stepwise regression, or classification and regression trees), then the initial plurality should preferably be comprised of a single subordinate model that does not use any data fields as input and that has an application condition that is always true. If a bottom-up method is used to construct the subordinate models (e.g., classification and regression rules), then the initial plurality should preferably be comprised of multiple subordinate models and associated application conditions, the application conditions preferably covering all possible combinations of values of the data fields.

Step 2 preferably comprises selecting a subordinate model, called the "current subordinate model," from the "current plurality" and then refining the "current subordinate model," thereby producing a new "current plurality." The refinements should preferably be performed as follows:

a) If the refinement involves introducing a new data field as input to the "current subordinate model" (e.g., as is done in forward steps of stepwise regression), then the "current plurality" should preferably be modified by removing the "current subordinate model" from the plurality and inserting two new subordinate models with appropriate application conditions. One of the new subordinate models should preferably include the new data field as input in addition to the other inputs of the "current subordinate model," and its application conditions should preferably be comprised of the application conditions of the "current subordinate model" together with the condition that the value of the new data field must NOT be missing. The other new subordinate model should preferably have the same inputs as the "current subordinate model," and its application conditions should preferably be comprised of the application conditions of the "current subordinate model" together with the condition that the value of the new data field MUST BE missing.

b) If the refinement involves removing a data field as input to the "current subordinate model" (e.g., as is done in backward steps of stepwise regression), then the "current plurality" should preferably be modified by removing the "current subordinate model" from the plurality and replacing it with a new subordinate model that employs the same inputs as the "current subordinate model," except for the data field that is being removed. To ensure consistency with all other subordinate models in the plurality, the application conditions of the new subordinate model should preferably be the same as those of the "current subordinate model."

c) If the refinement involves partitioning the cases that satisfy the application conditions of the "current subordinate model" into two or more segments and constructing separate subordinate models for each segment (e.g., as is done when constructing classification and regression trees), then the modifications to the "current plurality" should preferably comprise removing the "current subordinate model" from the plurality and inserting the new subordinate models with appropriate application conditions. The appropriate application conditions should preferably be comprised of the application conditions of the "current subordinate model" together with the partitioning conditions of the corresponding subordinate models. Moreover, if the partitioning conditions are well-defined only when certain data fields do not have missing values, and if the application conditions of the "current subordinate model" do not guarantee these fields not to be missing, then the application conditions of the new subordinate models should preferably be further strengthened by also requiring that the affected data fields not have missing values. If the application conditions of the new subordinate models so constructed are not exhaustive with respect to the application conditions of the "current subordinate model" (i.e., if it is not the case that the application conditions of at least one of the new subordinate models is satisfied whenever the application conditions of the "current subordinate model" is satisfied), then an additional subordinate model should preferably be added to the plurality to achieve exhaustivity. The application conditions of the additional subordinate model should preferably be comprised of the application conditions of the "current subordinate model" together with an additional condition that is satisfied only when the application conditions of the other newly-added subordinate models are not satisfied. In particular, if the application conditions of the other newly-added subordinate models had previously been strengthened as described above so as to ensure that certain data fields do not have missing values, then the application conditions of the additional subordinate model should preferably be satisfied when one or more of those data fields do in fact have missing values.

d) If the refinement involves expanding the cases for which the "current subordinate model" is applicable (e.g., as is done when constructing classification and regression rules), then the modifications to the "current plurality" should preferably comprise removing the "current subordinate model" from the plurality and constructing a new subordinate model whose application conditions define the expanded set of cases for which the new subordinate model is applicable. The new subordinate model should preferably have the same input data fields as the "current subordinate model," except for those input data fields that are no longer guaranteed not to have missing values under the expanded application conditions.

Step 3 preferably comprises repeating Step 2 until it is decided that no further refinements are justified.

Step 4 preferably comprises analyzing the refinements that were performed in Step 2 and selecting a subset of the refinements so as to maximize the predictive accuracy of the resulting plurality of subordinate models (e.g., as is done when pruning classification and regression trees).

Step 5 preferably comprises outputting a specification of the plurality of subordinate models and their associated application conditions, preferably to a storage device readable by a machine, thereby enabling the plurality to be readily applied to generate predictions.

The invention just disclosed can be viewed as a unique and previously unrecognized way of combining the first three prior art methods listed earlier in a manner that avoids their individual deficiencies; specifically, 1) THE INVENTION IGNORES TRAINING CASES THAT CONTAIN MISSING VALUES in the construction of some subordinate models, but not in the construction of all subordinate models. Cases are ignored only if they contain missing values in data fields that are required not to have missing values by the application conditions of the subordinate model being constructed. However, for every subordinate model that requires a particular data field not to have a missing value, another subordinate model is preferably constructed for the case in which that data field does have a missing value. When the preferred method steps of the invention are applied, every training case is used in the construction of some subordinate model and no training cases are completely ignored in the construction of the overall model.

2) THE INVENTION IGNORES DATA FIELDS THAT CONTAIN MISSING VALUES in the construction of some subordinate models, but not in the construction of all subordinate models. If the known values of a data field are found to be highly predictive, then the invention permits those known values to be used in the construction of one or more subordinate models. However, in that case, alternate subordinate models are preferably constructed to generate predictions when the value of the data field is missing. The data field is ignored only during the construction of these latter subordinate models, and then only if the missing values for that field are being treated as missing at random (see further discussion below).

3) THE INVENTION TREATS "MISSING" AS A LEGITIMATE DATA VALUE, but only for missing values that are being treated as informative. When evaluating application conditions during the construction of subordinate models, tests for informative missing values have the same effect as tests on known data values. However, when missing values in one or more data fields are treated as missing at random, the use of additional training cases that indirectly satisfy the application conditions has the effect of ignoring those particular data fields when constructing subordinate models. In the latter case, missing values are not being treated as legitimate data values in the construction of subordinate models; instead, they only affect which subordinate models are applied after training has been completed in order to generate predictions. Moreover, unlike prior art methods, the invention permits the treatment of missing values to be determined as an integral part of the predictive modeling method.

The invention also overcomes some of the deficiencies of the other three prior art methods listed earlier. Specifically:

1) THE INVENTION AVOIDS FILLING-IN MISSING VALUES VIA IMPUTATION PROCEDURES, and it thereby avoids the estimation errors that accompany imputation. For example, a common imputation procedure is to replace missing values with the average of the known values of a data field. If this procedure was applied to the missing values of X in FIG. 1, wherein the mean of the known values of X is 10.8, then the resulting equation for the predicted value of Y obtained using least-squares regression would be Predicted $Y=(0.545)*X+0.992$.

If the same was done for the missing values of X in FIG. 2, the resulting equation would be Predicted $Y=(0.545)*X-11.383$.

Clearly, both equations are inferior to the equation obtained using the invention presented herein in which only known values of X would preferably be employed, that equation being Predicted $Y=(0.5)*X+1$.

Similar errors would likewise arise using other imputation procedures.

2) THE INVENTION AVOIDS WEIGHTING SCHEMES THAT ATTEMPT TO COMPENSATE FOR THE PRESENCE OF MISSING DATA. By not requiring the use of weights, the invention can be employed in combination with any modeling method used to construct subordinate models without having to modify the estimation procedures employed by those methods.

3) THE INVENTION AVOIDS THE INTRODUCTION OF FREE PARAMETERS INTO THE MODEL TO REPRESENT MISSING DATA, AND IT THEREBY AVOIDS THE NEED TO ESTIMATE THESE PARAMETERS BASED ON THE DATA VALUES THAT ARE KNOWN. In so doing, the invention avoids complicated estimation procedures, allowing the invention to be readily applied in practice.

What is claimed is:

1. A program storage device readable by a machine, tangibly embodying a program of instructions executable by the machine to perform method steps for constructing a predictive model that can be used to make predictions even when the values of some or all inputs are missing or are otherwise unknown, the method comprising:

(1) presenting a collection of training data comprising examples of input values that are available to the model together with corresponding desired output value(s) that the model is intended to predict;

(2) generating a plurality of subordinate models, that together comprise an overall model, in such a way that:

a) each subordinate model has an associated set of application conditions that must be satisfied in order to apply the subordinate model when making predictions, the application conditions comprising:

i) tests for missing values for all, some, or none of the inputs, and ii) tests on the values of all, some, or none of the inputs that are applicable when the values of the inputs mentioned in the tests have known values; and b) for at least one subordinate model, the training cases used in the construction of that subordinate model include some cases that indirectly satisfy the application conditions such that the application conditions are satisfied only after replacing one or more known data values in these training cases with missing values; and 3) outputting a specification of at least one of said subordinate models thus generated and making a prediction based on said at least one of said subordinate models thus-generated.

2. A device according to claim 1, wherein step (2) comprises generating a plurality of subordinate models such that the plurality cannot be arranged into a decision-tree hierarchy in such a way that:

(1) each branch of the tree corresponds to a test on the values of one or more data fields that can be satisfied only when those data fields have known values;

(2) each leaf of the tree corresponds to a subordinate model whose application conditions are defined by the conjunction of the tests along the branches that lead from the root node of the tree to the leaf node;

(3) the root node of the tree corresponds to a subordinate model whose application conditions include missing-value tests for the data fields mentioned in the tests associated with the tree branches that emanate from the root node; and (4) each interior node of the tree other than the root node corresponds to a subordinate model whose application conditions are defined by the conjunction of the tests along the branches that lead from the root node of the tree to the interior node, together with missing-value tests for the data fields mentioned in the tests associated with the tree branches that emanate from the interior node.

3. The program storage device according to claim 1, wherein, when an additional data field is incorporated into the construction of a subordinate model, an alternate subordinate model is constructed for use when said additional data field has a missing value.

4. The program storage device according to claim 1, wherein a missing value is estimated by performing a prediction based on the known data values.

5. The program storage device according to claim 1, wherein each subordinate model has an application condition that must be satisfied for said each subordinate model to be applied, and wherein said application condition includes at least one of the values to be input to the model being missing.

6. The program storage device according to claim 1, wherein said outputting comprises outputting a specification of a plurality of subordinate models and their associated application conditions, and reading said specification being readable by the machine.

7. The program storage device according to claim 1, wherein said values are missing at random.

8. The program storage device according to claim 1, wherein based on said data collection, it is determined whether missing data values are missing at random or whether missing values convey information.

9. The program storage device according to claim 1, wherein a determination of randomness of missing values is made by examining the data values present.

10. The program storage device according to claim 1, wherein statistical tests are employed to determine randomness of missing values.

11. The program storage device according to claim 1, wherein randomness of missing values is assessed with a cross-validation technique.

12. The program storage device according to claim 11, wherein applying the cross validation technique comprises:

selecting and holding aside portions of the training cases that directly satisfy the application conditions of a subordinate model for validation purposes;

constructing first and second models using remaining training cases that directly satisfy the application conditions but were not held aside, such that one of the first and second models is constructed based only on the remaining cases and the second model is constructed based on the remaining cases plus the training cases that indirectly satisfy the application conditions;

estimating prediction errors of the first and second models by applying the models to the training cases held aside for validation purposes;

if a predictive accuracy of the first model is greater than that of the second model with a predetermined sufficiently high statistical significance, then assuming that missing values in the relevant fields are informative and the subordinate model should be constructed only from those training cases that directly satisfy the application conditions of the subordinate model; and if a predictive accuracy of the first model is greater than that of the second model with a predetermined sufficiently high statistical significance, then missing values are treated as random events and the training cases that directly or indirectly satisfy the application conditions are used in the construction of the subordinate model.

13. The program storage device according to claim 12, wherein the cross-validation method further comprises:

if a subordinate model is constructed for use when two or more data fields have missing values, then missing values of some of these data fields are treated as missing at random and others of said data fields are treated as informative, wherein the training cases constructing the subordinate model includes those that directly satisfy the application conditions of the subordinate model together with those that indirectly satisfy the application conditions when known data values are replaced with missing values, but only for those data fields for which missing values are to be treated as missing at random.

14. The program storage device according to claim 13, wherein determining whether said missing values should be treated as missing at random or which should be treated as informative, includes:

constructing a model assuming that all missing values are to be treated as informative, such that the model is constructed from those training cases that directly satisfy the application conditions of the subordinate model but are not being held aside for validation purposes, said model being termed the "current model";

for each missing value in the "current model" that is treated as informative, constructing another model that treats that missing value as missing at random while treating all other missing values in the same manner as the "current model";

of the new models, choosing the one model that yields the greatest predictive accuracy on the training cases defined in said constructing that were used to construct the first "current model," and calling this new model the "current model";

repeating the constructing of the another model and the choosing until all missing values are treated as missing at random by the "current model";

of all "current models" obtained in the constructing of the "current model" and choosing, choosing the model that yields the greatest predictive accuracy on the training cases held aside for validation purposes, and calling this model the "best model"; and constructing the subordinate model, without holding training cases aside for validation purposes, using the same treatments of missing values used in the construction of the "best model."

15. The program storage device according to claim 1, wherein a determination as to how to treat missing values for subordinate models is deferred.

16. The program storage device according to claim 1, wherein if a top-down method is employed to construct the subordinate models, then the plurality of models include a single subordinate model that does not use any data fields as input and which has an application condition that is always true.

17. The program storage device according to claim 1, wherein if a bottom-up method is employed to construct the subordinate model, then the plurality of models include a plurality of subordinate models and application conditions, the application conditions covering all possible combinations of values of the data fields.

18. The program storage device according to claim 1, wherein training cases are ignored only if they contain missing values in data fields that are required not to have missing values by the application conditions of the subordinate model being constructed.

19. The program storage device according to claim 1, wherein data fields that contain missing values are ignored in the construction of only subordinate models, and wherein a missing value deemed to be informative is treated as a legitimate data value.

20. The program storage device according to claim 1, wherein said method is devoid of filing in missing values with an imputation procedure, a weighting scheme to compensate for the presence of missing data, and introduction of free parameters into the subordinate model to represent missing data.

* * * * *